United States Patent
Weiss (10) Patent No.: US 6,384,992 B1
(45) Date of Patent: May 7, 2002

(54) HOLDER FOR ATTACHING A COMPONENT WITH A DOVETAIL SLOT

(75) Inventor: Albrecht Weiss, Linden (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/633,262

(22) Filed: Aug. 4, 2000

(30) Foreign Application Priority Data

Aug. 5, 1999 (DE) .......................... 199 36 497

(51) Int. Cl.⁷ .......................... G02B 21/00; G02B 7/02
(52) U.S. Cl. .................. 359/819; 359/381; 359/821
(58) Field of Search ................. 359/811, 821, 359/381, 384

(56) References Cited

U.S. PATENT DOCUMENTS

| 5,180,089 A | * | 1/1993 | Suman et al. ............. 224/42.25 |
| 5,564,836 A | * | 10/1996 | Ide et al. ..................... 384/122 |
| 6,231,260 B1 | * | 5/2001 | Markulec ..................... 403/24 |
| 6,265,648 B1 | * | 7/2001 | Steinberger .................. 84/293 |

FOREIGN PATENT DOCUMENTS

EP   1 074 334 A1   *   7/2001

* cited by examiner

Primary Examiner—Georgia Epps
Assistant Examiner—Tim Thompson
(74) Attorney, Agent, or Firm—Foley & Lardner (57) ABSTRACT

The application describes a holder for attaching a component with outside dovetail carriages to a bearing surface. A pin-like bolt and, next to it, a ssion spring, which is bent away from the bolt under preloading, are attached in front of the bearing surface as interacting holder components. The cross sections, the lengths and the distance between the bolt and the compression spring are adapted to the inner profile of the dovetail carriage. To attach the component, the dovetail carriage is pressed manually by means of the bolt and the compression spring, until it comes into contact with the bearing surface, and is latched in place. The bolt and the compression spring are pressed into the inner sides of the dovetail carriage on both sides by the preloading of the bent compression spring. Advantageously, the compression spring is additionally preloaded toward the bearing surface. The holder offers precise, tilt-resistant attachment of the component in any three-dimensional position while requiring very little space. Multiple holders having a plurality of holders on a displaceable longitudinal slide or a rotable cylinder are suitable for attaching a plurality of fluorescence filter blocks for optional use in a fluorescence microscope.

32 Claims, 5 Drawing Sheets

HOLDER FOR ATTACHING A COMPONENT WITH A DOVETAIL SLOT

FIELD OF THE INVENTION

The invention relates to a holder for attaching to a bearing surface a component having a dovetail slot or carriage on its outside.

BACKGROUND OF THE INVENTION

Various holders are known which can be used to attach components having a dovetail carriage arranged on the outside to a bearing surface. Three such holders are illustrated in FIGS. 1a–1c.

Figures 1A, 1B:
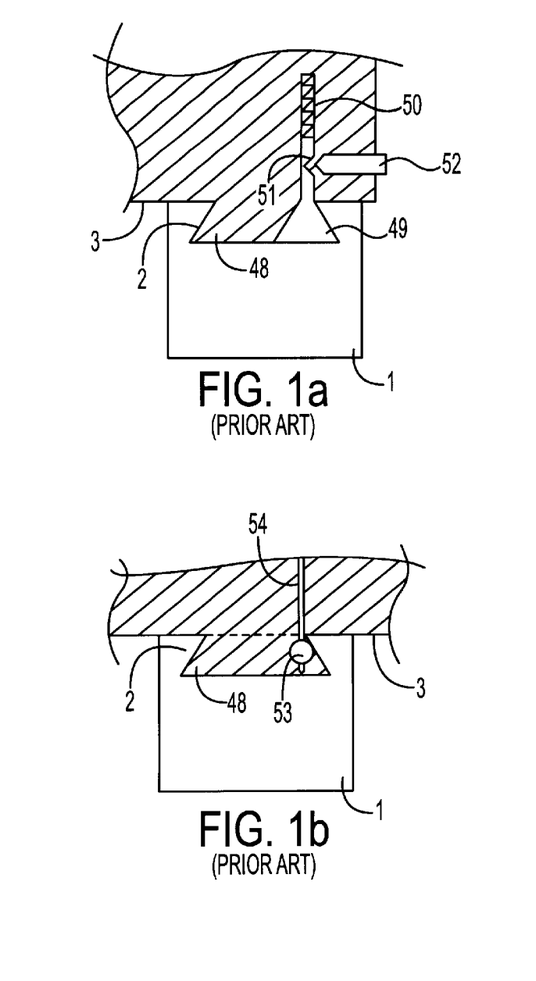
FIG. 1a shows a side view of a first known holder for a component with dovetail carriages on the outside.
FIG. 1b shows a side view of a second known holder for a component with dovetail carriages on the outside.

FIG. 1a shows a section through a component 1 which has a dovetail carriage 2 on one of its outer sides. A bearing surface 3 has a dovetail guide 48 which is matched to the internal profile of the dovetail carriage 2. A turned part 49 with integrally formed cone is recessed into the dovetail guide 48, perpendicular to the bearing surface 3, in the region of the edge of the dovetail guide 48, and is preloaded behind the bearing surface 3 by a restoring spring 50. At the side, the turned part 49 has a conical groove 51 into which the tip of a grub screw 52 fits. It can be seen clearly that the profile of the cone of the turned part 49 is formed identically to the outer profile of the dovetail guide 48. When the grub screw 52 is tightened, the cone of the turned part 49 is pressed toward the restoring spring 50, against the inside of the dovetail carriage 2, and clamps the latter securely in place. This type of holder is prevented from tilting on both sides of the dovetail guide 48 and is also secured so that the component 1 cannot inadvertently be pulled off the bearing surface 3. However, the drawback of the holder is that a tool is required for assembly in order to tighten the grub screw 52. Moreover, the turned part 49 with the cone and the restoring spring 50 arranged behind it projects a long way behind the bearing surface 3. Consequently, a large amount of space is required behind the bearing surface 3, which may amount to 15 mm or more. However, a large holder can only be integrated into another device with difficulty.

FIG. 1b shows a second variant of a holder for a component 1 with a dovetail carriage 2 arranged on the outside. Once again, a dovetail guide 48 with a profile matched to the dovetail carriage 2 is machined in front of a bearing surface 3. However, one side of the dovetail guide 48 is interrupted at approximately half its length. Consequently, a partial region of the dovetail carriage 2 remains free and is not filled by the dovetail guide 48. A ball 53 is arranged laterally in this partial clear region, bearing against the inside of the dovetail carriage 2, which ball is adhesively bonded to a leaf spring 54. That end of the leaf spring 54 which is remote from the ball 53 projects into a free space well behind the bearing surface 3 and at this end is attached behind the bearing surface 3. The spring force of the leaf spring 54 presses the adhesively bonded ball 53 against the internal profile of the dovetail carriage 2, so that the dovetail carriage 2 is held on the dovetail guide 48 in the set position. The dovetail guide 48 itself prevents the component 1 from being able to tilt laterally with respect to the bearing surface 3. The advantage of this holder compared to that illustrated in FIG. 1a is that there is no tool required for assembly. However, the drawback of this solution is that the ball 53 can become detached from the bonding point as a result of the load imposed. Moreover, in this holder sufficient installation space for the leaf spring 54 is required behind the bearing surface 3.

Figure 1C:
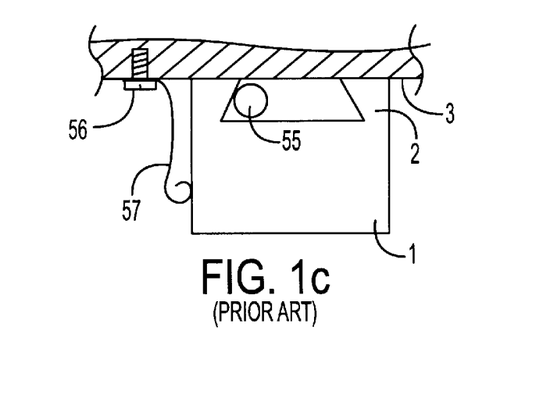
FIG. 1c shows a side view of a third known holder for a component with dovetail carriages on the outside.

FIG. 1c shows a third variant of a holder for attaching a component 1 with a dovetail carriage 2 arranged on the outside to a bearing surface 3. In this case, there is no longer a dovetail guide 48 arranged in front of the bearing surface 3. Instead, a bolt 55, which is fitted into one lateral internal profile of the dovetail carriage 2, is secured just in front of and parallel to the bearing surface 3. A bent leaf spring 57, which presses laterally against the component 1, is attached laterally next to the component 1 by means of a screw 56. The advantage of this holder is that there is no need for any space behind the bearing surface 3, since all the holder components are arranged in front of the bearing surface 3. However, as a result of a dovetail guide on the bearing surface 3 being dispensed with, the component 1 is not prevented from tilting in all directions. Consequently, although the component 1 is unable to tilt in the direction of the bent leaf spring 57, since it is deflected back by the force of the spring, it is not prevented from tilting away from the leaf spring 57, since the component 1 then remains tilted and is not deflected back. Further drawbacks are that space is required for the leaf spring 57 laterally next to the component 1. Moreover, if the leaf spring 57 is fitted or removed incorrectly, it is easily bent or broken off.

Accordingly, there is a need for an invention that provides the advantages of the three devices described above without also providing the disadvantages. Thus, there is a need for an invention that allows for the attachment of a component that has a dovetail carriage on the outside to a bearing surface that does not require the use of tools, does not allow the component to tilt, does not project a long way behind the bearing surface, and does not fail under the imposed loads.

SUMMARY OF THE INVENTION

The object of the present invention is to provide a holder that requires very little space and with which a component having a dovetail carriage arranged on the outside can be attached to a bearing surface reliably and in a manner that it is prevented from tilting, without using a tool.

In accomplishing the foregoing and other objects, there has been provided according to the present invention a holder for attaching at least one component having a dovetail slot to at least one bearing surface. The holder comprises at least one elongated member that is fixed with respect to at least one bearing surface, and a preloaded compressible resilient member that is fixed with respect to at least one bearing surface adjacent to each elongated member. The elongated member and the compressible resilient member cooperate with the dovetail slot to secure a component against the bearing surface.

In the preferred embodiment of the present invention, the elongated member is a pin-like bolt that is attached just in front of and parallel to the bearing surface, and the compressible resilient member is a compression spring that is attached just in front of and parallel to the bearing surface adjacent to the block. The compression spring is bent away from the bolt under preloading such that the bolt and the compression spring are pressed into the two inner sides of the dovetail slot.

There also has been provided according to the present invention a multiple holder for attaching multiple components having a symmetrical dovetail slots to at least one bearing surface that comprises a mounting member having a plurality of holders mounted thereon. In one embodiment of the multiple holder, the mounting member is an elongated bar having a single bearing surface. In another embodiment, the mounting member is a cylinder having multiple bearing surfaces.

There also has been provided according to the present invention a fluorescence microscope having an illuminating beam path that is directed onto a specimen and an imaging beam path that starts from the specimen that comprises a lens positioned in the imaging beam path, and an eyepiece for viewing the imaging beam, and at least one holder. In one embodiment, the fluorescence microscope includes a single holder. In other alternative embodiments, the fluorescence microscope includes a mounting member having a plurality of holders mounted thereon, wherein each holder can be moved into a functional position.

Further objects, features and advantages of the invention will become apparent from the detailed description of preferred embodiments that follows, when considered together with the accompanying figures of drawing.

BRIEF DESCRIPTION OF THE DRAWINGS

Advantageous exemplary embodiments of the invention are explained in more detail below with reference to the drawings, in which:

FIG. 4b shows a view in the axial direction, from below, of the cylindrical octuple holder shown in FIG. 4a;

DETAILED DESCRIPTION OF THE PREFERRED EMBODIMENTS

The object of the present invention is achieved in a preferred way by attaching a pin-like bolt and, next to it, a compression spring which is bent away from the bolt under preloading, in front of and parallel to the bearing surface, as interacting holder components. The cross section and length of the bolt and compression spring are dimensioned in such a way that they can engage in the two inner sides of the dovetail carriage.

The attachment of the component with the dovetail carriage on the outside takes place in such a way that the dovetail carriage is pressed by means of the bolt and the compression spring until it comes into contact with the bearing surface, where it is latched in place. For this purpose, the distance between the bolt and the compression spring is adapted to the internal width of the dovetail carriage, so that the bolt and the compression spring themselves are pressed into the inside of the dovetail carriage on both sides by the preloading of the bent compression spring.

The holder according to the invention has the advantage that it does not require any space for holder elements behind the bearing surface and outside the dovetail carriage, and consequently it can easily be integrated into other devices. It is inexpensive and ensures a reliable connection, which prevents tilting in all directions, between the component which is to be held and the bearing surface. The component and the holder can be joined together simply by exerting manual pressure, without having to use a tool.

The compression spring may be attached to the bearing surface for example by screw means. If the attachment is made by screw means, two screws are screwed into the bearing surface on a line which is parallel to the bolt. Two ring eyelets which are situated at the ends of the compression spring are clamped against the bearing surface by means of these two screws. In the load-free state, the compression spring is longer than the distance between the two screws, so that in the screwed-on state it is under preloading and is bent. According to the invention, the spring is fitted in such a way that, in the screwed-on position, it is bent away from the bolt, so that it can engage in one inner side of the dovetail carriage.

The bolt may either be cylindrical or have a cross-section defined by three or more sides. The bolt may be attached, for example, by means of two holder pins which project at right angles from the bearing surface. In this case, the two end faces of the bolt are attached to these two holding pins. In another variant of the holder, two holding pins, which face in the direction of the bolt axis and are attached next to the two bolt ends to a frame that is elevated relative to the bearing surface, are attached to the two end faces of the bolt. The most simple variant of attachment is obtained if the bolt is selected to be sufficiently long for its two ends to engage in this elevated frame.

By means of a preferred design of the compression spring and its ring eyelets, it is possible to have a positive effect on the way in which the holder functions. Thus, in one advantageous configuration of the holder, the two ring eyelets are attached to the outer edge of each of the two ends of the compression spring, in such a way that they lie in one plane before they are screwed down. The two ring eyelets are clamped against the bearing surface by two screws, which are preferably arranged on a line which is parallel to the bolts. Since the length of the load-free compression spring is greater than the distance between the two screws, the compression spring is bent away from the bolt under preloading. Without a component pressed onto it, the curved compression spring with the dovetail carriage located on the outside always bears flat against the bearing surface.

In another embodiment, two ring eyelets are once again formed integrally on the outer edge of both ends of the compression spring. However, in this case they are both angled off toward the bearing surface before they are screwed down. In this case too, the compression spring is secured in place by the fact that the ring eyelets are clamped against the bearing surface by means of two screws. The distance between the screws is once again shorter than the length of the load-free compression spring, and the screws once again lie on a line which is parallel to the bolt. The fact that the two ring eyelets are angled off means that, once they have been screwed in place, the compression spring is not only bent away from the bolt, but also is pressed onto the bearing surface. This generates an additional force in the direction of the bearing surface.

The holder according to the invention allows attachment, which is secured against tilting, for a component having a dovetail carriage on the outside. In order to prevent displacement of the dovetail carriage in the longitudinal direction of the bolt, an elevated strip is arranged on the bearing surface next to at least one end of the bolt as a securing stop.

Due to its compact, space-saving design, the holder according to the invention is suitable for forming multiple holders. By way of example, it is possible for a plurality of holders according to the invention to be arranged next to one another on a longitudinal slide. In this case, any one of the holders according to the invention can be moved into the functional position through lateral displacement of the longitudinal slide in a guide rail.

A different multiple holder is obtained if a plurality of flattened sections, which serve as bearing surfaces, are provided on the external circumference of a cylinder. A holder according to the invention is arranged on each of these flattened sections. The cylinder is arranged rotatably on a fixed axis of rotation. In this way, any one of the holders according to the invention can be moved into the functional position through rotation of the cylinder. It has proven advantageous if a turntable is attached coaxially to the cylinder, so that the cylinder can be rotated by means of a manual or motor action on the turntable. If the components which are attached to the holders bear optically active components which are to be introduced into a beam path, the turntable is advantageously equipped with an opening next to each holder that allows light to pass through freely.

The holder according to the invention, and also the multiple holders using the holder according to the invention, may advantageously be used to hold fluorescence filter blocks in a fluorescence microscope, the holder or the multiple holder in each case being fitted into the microscope in a suitable way, so that the filters become optically active in the associated beam paths.

Figure 2A:
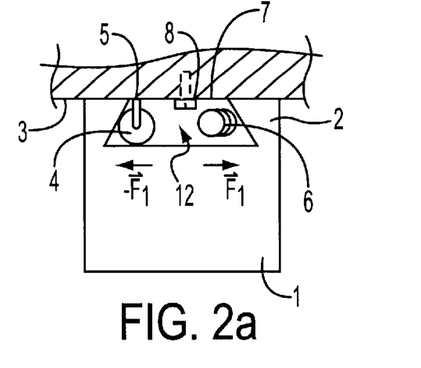
FIG. 2a shows a side view of a holder according to the invention for a component with dovetail carriages on the outside.

FIG. 2a shows a side view of a holder 12 according to the invention. A component 1 having a dovetail carriage or slot 2 on the outside bears against a bearing surface 3 of a supporting base. A bolt 4, which is fitted into the left-hand inner side of the dovetail carriage 2, is arranged in front of and parallel to the bearing surface 3. The bolt 4 is attached to two holding pins 5 (only one of which can be seen in section here) which project at right angles from the bearing surface 3. Next to the bolt 4, there is a compression spring 6, once again in front of the bearing surface 3. For this purpose, two ring eyelets 7 (only one of which can be seen here) which are situated at its ends are clamped against the bearing surface 3 in each case by means of a screw 8.

The cross section and the length of the bolt 4 and the compression spring 6 are matched to the internal profile of the dovetail carriage 2, so that the component 1 with its dovetail carriage 2 is pressed onto the bearing surface 3 by means of the bolt 4 and the compression spring 6 and can be held securely in the desired position.

The compression spring 6 is bent away from the bolt 4 under preloading. As a result, the bolt 4 and the compression spring 6 are pressed into the two inner sides of the dovetail carriage 2 under a force $\vec{F}_1$ or $-\vec{F}_1$. These forces ensure that the component 1 is secured against the bearing surface 3 in such a manner that it cannot tilt. Without the component 1 pressed on, the compression spring 6 lies flat in front of the bearing surface 3, and is only bent upward from the bearing surface 3 by the pressed-on component 1. The additional result is a slight tension in the direction of the bearing surface 3, with the result that the component 1 is also held securely in the suspended position illustrated here.

Figure 2B:
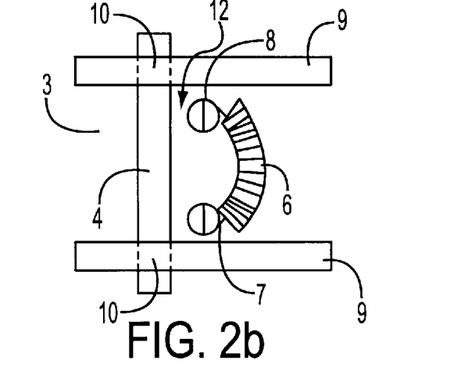
FIG. 2b shows a plan view of a holder according to the invention.

FIG. 2b shows a plan view of a holder 12 according to the invention, comprising a bolt 4 and a compression spring 6 arranged according to the invention with respect to one another.

The bolt 4 is arranged in front of a bearing surface 3. A strip 9 which is raised above the bearing surface 3 is arranged at each of the two ends of the bolt 4. The strip 9 is used to secure the bolt 4, the ends of which are passed through holes 10 in the two strips 9. In this way, the bolt 4 is held a short distance in front of the bearing surface 3, which is required for the attachment of a component 1 with a dovetail carriage 2 on the outside.

The compression spring 6 is attached to the bearing surface 3 next to the bolt 4. For this purpose, two screws 8 are passed through the ring eyelets 7 formed integrally at the ends of the compression spring 6, which screws 8 clamp the ring eyelets 7 against the bearing surface 3. The two screws 8 are screwed into the bearing surface 3 on a straight line which is parallel to the bolt 4. The compression spring 6 is bent away from the bolt 4 under preloading. The preloading is produced by the fact that in the load-free state the compression spring 6 is longer than the distance between the two screws 8 in the bearing surface 3.

A component 1 with a dovetail carriage 2 on the outside (not shown) can be pressed until it comes into contact with the bearing surface 3 by means of the bolt 4 and the compression spring 6, until the bolt 4 and the compression spring 6 engage in the inner sides of the dovetail guide and are pressed into these inner sides of the dovetail carriage by the preloading of the bent compression spring 6. The component is then held by the bolt 4 and the compression spring 6 and is pressed onto the bearing surface 3. At the same time, an attached component is secured by the two raised strips 9 in such a way that it cannot slip off the bolt 4, i.e. it cannot slip off as a result, for example, of the component being inadvertently displaced in the longitudinal direction of the bolt 4.

Figure 2C:
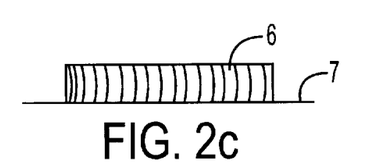
FIG. 2c shows a design of a load-free compression spring for a holder according to the invention.

FIG. 2c shows a design of a load-free compression spring 6 for a holder 12 according to the invention. At both ends, the compression spring 6 has two ring eyelets 7, which are each formed integrally on the outer edge and lie in the same plane. Therefore, the two ring eyelets 7 of the load-free compression spring 6 can bear flat against a base.

Figure 2D:
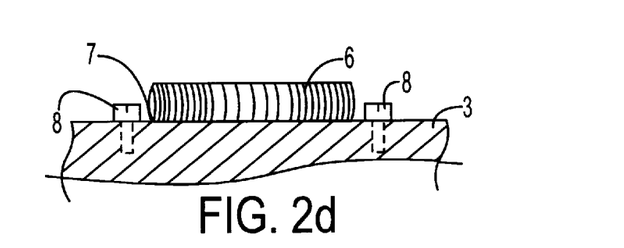
FIG. 2d shows an installed compression spring as shown in FIG. 2c.

FIG. 2d shows the compression spring 6 from FIG. 2c in the fitted state. The compression spring 6 is attached in front of a bearing surface 3, in that the ring eyelets 7, at their ends, are clamped flat against the bearing surface 3 by two screws 8. For this purpose, the two screws 8 are screwed into the bearing surface 3 on a straight line which is parallel to the bolt 4 (not shown). The distance between the screws 8 is shorter than the length of the load-free compression spring 6, so that the compression spring 6 is bent away from the bolt 4 under preloading.

Figure 2E:
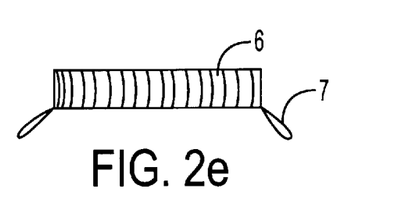
FIG. 2e shows another design of a load-free compression spring for a holder according to the invention.

FIG. 2e shows another design of a load-free compression spring 6 for a holder 12 according to the invention. The compression spring 6 likewise has two ring eyelets 7 at its two ends, which eyelets are each formed integrally on the outer edge. The two ring eyelets 7 are angled off toward the same side, so that they both form an angle, i.e. they lie in two planes. The load-free compression spring 6 therefore cannot rest with its two ring eyelets 7 flat on a base.

Figure 2F:
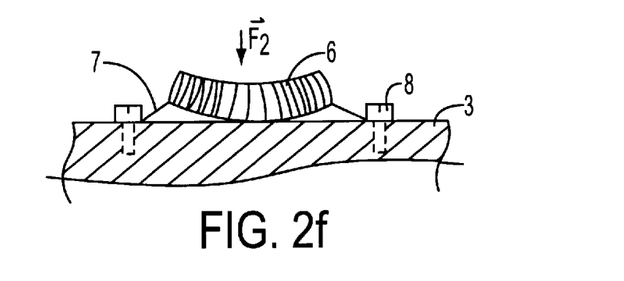
FIG. 2f shows an installed compression spring as shown in FIG. 2e.

FIG. 2f shows a side view, from the longitudinal side, of the compression spring 6 from FIG. 2e in the fitted state. The compression spring 6 is attached in front of a bearing surface 3, in that the angled-off ring eyelets 7 are clamped against the bearing surface 3 at their ends by means of two screws 8. For this purpose, the two screws 8 are screwed into the bearing surface 3 on a straight line which is parallel to the bolt 4 (not shown). When the screws 8 are tightened, the compression spring 6 is bent away from the bolt 4. In addition, it is bent at an angle toward the bearing surface 3 in the middle region, while at the same time the ends of the compression spring 6 remain pressed upward by the angled-off ring eyelets 7. For this purpose, the two screws 8 are screwed into the bearing surface 3 until the angled-off ring eyelets 7 are clamped substantially flat against the bearing surface 3. As a result, the middle part of the compression spring 6 is pressed against the bearing surface 3 under a strong force $\vec{F}_2$.

Figure 2G:
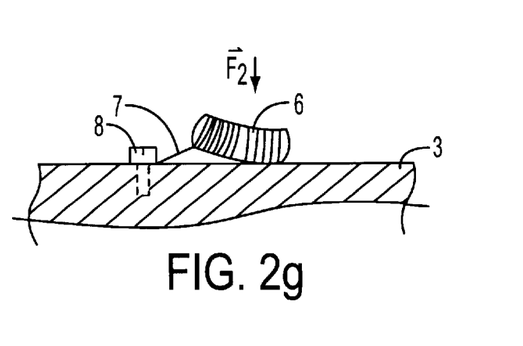
FIG. 2g shows the same as FIG. 2f, with the illustration shifted through 90°.

FIG. 2g shows a side view, from one end, of the compression spring 6 from FIG. 2f in the fitted state. The ends of the ring eyelets 7 of the compression spring 6 are pressed against a bearing surface 3 by means of screws 8. The compression spring 6 is bent away from an adjacent bolt 4 under preloading and, at the same time, is bent toward the bearing surface 3 under preloading.

Figure 2H:
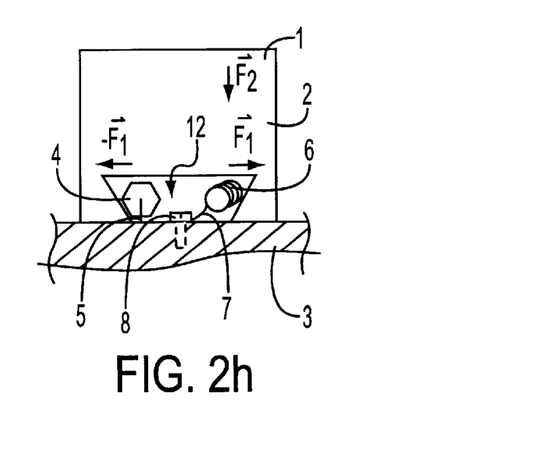
FIG. 2h shows a holder with compression spring as shown in FIG. 2e, with a component held in place.

FIG. 2h shows a holder 12 according to the invention, having a bolt 4, which is attached in front of a bearing surface 3 by means of holding pins 5, and a compression spring 6 with angled-off ring eyelets 7, as shown in FIGS. 2e, f and g. The compression spring 6 is bent away from the bolt 4, with the result that the compression spring 6, under a force $\vec{F}_1$, and the bolt 4, under a force $-\vec{F}_1$, are pressed into the two inner sides of the dovetail carriage 2. As in FIG. 2e, the angled-off ring eyelets 7 are clamped almost entirely against the bearing surface 3 by means of screws 8, with the result that the compression spring 6 is pressed into the inner side of the internal profile of the dovetail carriage, under a force $\vec{F}_2$, toward the bearing surface 3.

A component 1, which is pressed onto the bolt 4 and the compression spring 6 and which has a dovetail carriage 2 on the outside, is pressed against the bearing surface 3 by the compression spring 6 under an additional force $\vec{F}_2$. As a result, the connection between the bearing surface 3 and the secured component 1 is provided with even further protection against tilting and tension with respect to the component 1 compared to a holder which only has a compression spring 6 with ring eyelets 7 which are not angled off.

Figure 3A:
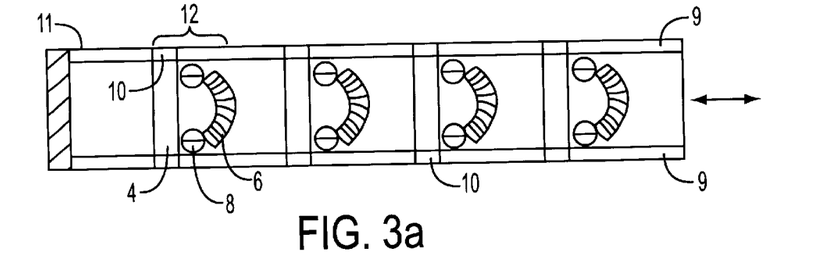
FIG. 3a shows a side view of a longitudinal slide as a multiple holder.

FIG. 3a shows a multiple holder in the form of a longitudinal slide 11. A plurality of holders 12 according to the invention, which each have a bolt 4 and a compression spring 6 arranged next to one another according to the invention, are arranged on this longitudinal slide.

Each compression spring 6 is attached to the longitudinal slide 11 by two screws 8 in such a way that it is bent away from the bolt 4 under preloading. Two raised strips 9 are arranged in the longitudinal direction at the two outer edges of the longitudinal slide 11. These two strips 9 have a plurality of holes 10 into which the ends of the bolts 4 are fitted, as a result of which the bolts 4 are secured. In addition, a component 1 (not shown) whose outer dovetail carriage 2 (not shown) has been pressed onto the bolt 4 and the compression spring 6 is secured so that it cannot slide off the bolt 4 by means of the two raised strips 9.

Through displacement of the longitudinal slide 11 in the direction of the arrow illustrated, which can be effected either manually or by means of a motor, it is possible to move one specific holder 12 into the functional position. This functional position consists of a suitable position of the longitudinal slide 11 in which, for example, a component 1 can be attached to the holder 12 which has been moved into the functional position or in which a component 1 which has already been attached to this holder 12 can perform its function (e.g. as a tool in a machine or as an optical component 1 in an optical beam path).

Figure 3B:
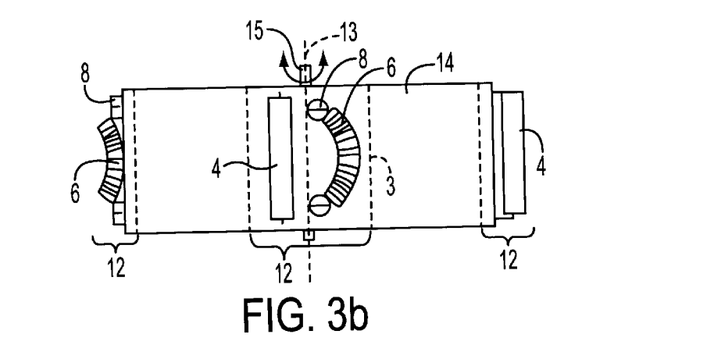
FIG. 3b shows a side view of a multiple holder of basically cylindrical form.

FIG. 3b shows a multiple holder in which a cylinder 14 is arranged rotatably on a fixed axis of rotation 13. On its outer circumference, the cylinder 14 has four flattened sections which serve as bearing surfaces 3. The boundary of the bearing surfaces 3 is marked by dotted lines. A holder 12 according to the invention comprising in each case one bolt 4 and one compression spring 6 arranged according to the invention is fitted to each bearing surface 3.

A plan view of one holder 12 is shown in the center, so that its associated combination of bolt 4 and compression spring 6 can be seen. The holders 12 on the left-hand side and the right-hand side are each illustrated in side view, so that in the case of the left-hand holder 12 the associated bolt 4 is covered and only the compression spring 6 can be seen. At the right-hand holder 12, the bolt 4 is visible and the associated compression spring 6 is covered. A fourth holder lies on the rear side of the cylinder 14 and is therefore completely covered. Through rotation of the cylinder 14 about the cylinder pin 15 which is concentric with respect to the axis of rotation 13, it is possible for any one of the four holders 12 to be moved into a specific position and therefore into the functional position.

Figure 3C:
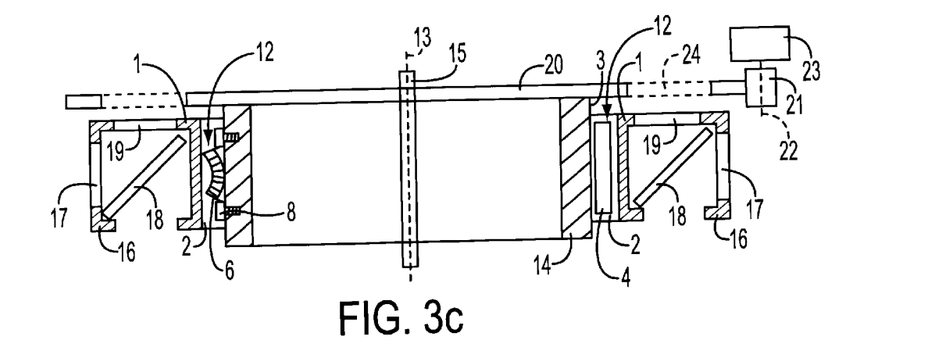
FIG. 3c shows a section through a motor-driven, cylindrical multiple holder with a drive motor arranged outside the axis of rotation.

FIG. 3c shows a section through a cylindrical multiple holder which is motor-driven. For this purpose, a cylinder 14 is arranged rotatably on a stationary cylinder pin 15 with an axis of rotation 13. On its outer circumference, the cylinder 14 has a plurality of flattened sections which serve as bearing surfaces 3 and on which a plurality of holders 12 according to the invention are arranged. On the right-hand side of the cylinder 14, a bolt 4, which is attached by holding pins 5 and which engages in an outer dovetail carriage 2 of a component 1, is illustrated. This component 1 is a cube-shaped fluorescence filter block 16 which has an excitation filter 17, a beam splitter 18 and a blocking filter 19 which, in a known arrangement, define a beam path running at right angles in a T-shape. A fluorescence filter block 16 of this type is usually employed in a fluorescence microscope to generate the desired illumination.

A further holder 12 according to the invention, of which only a compression spring 6 attached by screws 8 can be seen, is illustrated on the left-hand side of the cylinder 14. This holder 12 engages in a dovetail carriage 2 which is arranged on the outside of a component 1. The component 1 is once again a cube-shaped fluorescence filter block 16 with excitation filter 17, beam splitter 18 and blocking filter 19. Two further fluorescence filter blocks, which are attached in front of and behind the section plane, are not visible in the drawing.

A turntable 20 is attached coaxially to the cylinder pin 15. The diameter of the turntable 20 is selected to be sufficiently large for it to project beyond the cylinder 14 together with the fluorescence filter blocks 16 which are attached to it. As a result, it is possible to act on the peripheral region of the turntable 20 in order to set it in rotation, together with the cylinder 14. This action may in principle also be of manual nature. In the exemplary embodiment illustrated here, however, the turntable 20 has toothing on its outer edge, in which toothing a pinion 21, which is arranged on a motor spindle 22 of an electric drive motor 23, engages. This drive motor 23 may, for example, be a DC motor or a stepper motor. Next to each of the blocking filters 19 of the four fluorescence filter blocks 16 that are held on the cylinder 14, the turntable 20 has a clear opening 24 in order to allow the light beam guided past to pass through unimpeded.

Figure 3D:
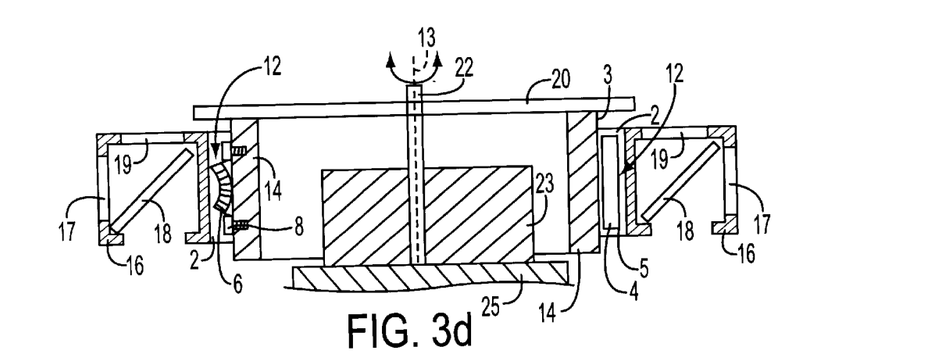
FIG. 3d shows a section through a motor-driven, cylindrical multiple holder with a coaxially arranged drive motor.

FIG. 3*d* shows another variant of a multiple holder of basic cylindrical form which can be rotated about an axis of rotation 13 by means of a motor. An electric drive motor 23 is arranged in a fixed position on a base 25 and has a rotatable motor spindle 22 with an axis of rotation 13. A cylinder 14 and a turntable 20 are arranged coaxially with respect to the motor spindle 22, the turntable 20 being fixedly connected to the cylinder 14. This turntable 20 rests in a fixed position on the motor spindle 22 and also rotates when the motor spindle 22 rotates. In this way, the entire cylinder 14 can be rotated into any desired position.

On its outer circumference, the cylinder 14 has flattened sections which serve as bearing surfaces 3 for a plurality of holders 12 according to the invention. For example, on the right-hand side there is a holder 12, of which only a bolt 4 can be seen in the illustration. This holder 12 engages in a dovetail carriage 2 which is arranged on the outside of a component 1. This component 1 is a cube-shaped fluorescence filter block 16 with an excitation filter 17, a beam splitter 18 and a blocking filter 19, which, in a known way, define a beam path which runs at right angles in a T-shape.

A further holder 12, of which only a compression spring 6 attached by means of screws 8 can be seen, is arranged on the left-hand side of the cylinder 14. The associated bolt does not lie in the plane of the drawing. Also attached to this holder 12 is a component 1 in whose outer dovetail carriage 2 the compression spring 6 and the bolt 4 (not shown) engage. This component is once again a cube-shaped fluorescence filter block 16 with an excitation filter 17, a beam splitter 18 and a blocking filter 19, in a known arrangement. A third holder 12 which is arranged on the front side of the cylinder 14 and a fourth holder 12 which is arranged on the rear side of the cylinder 14 are not visible in this sectional drawing.

Through rotation of the cylinder 14 by means of the drive motor 23, in each case one of the four holders 12 can be moved into a desired functional position in which, for example, the fluorescence filter block 16 attached to the holder 12 lies in a predetermined beam path.

Figure 4A:
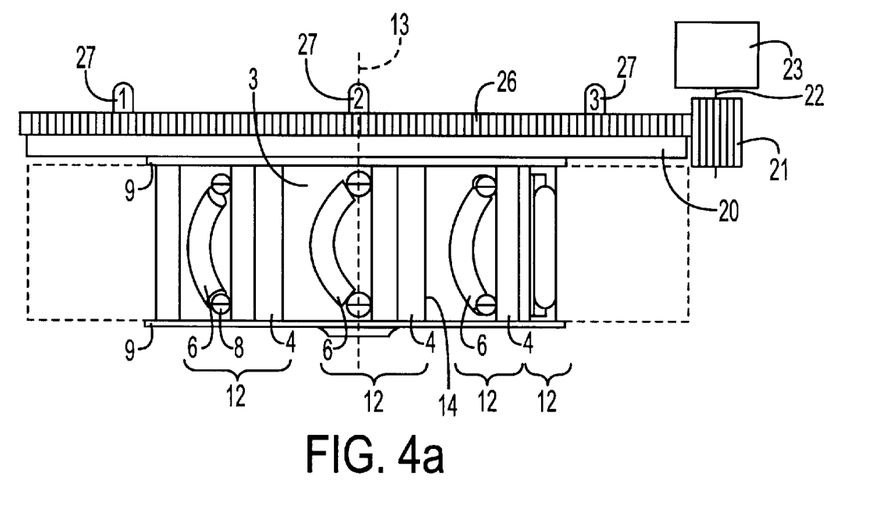
FIG. 4a shows a side view of a cylindrical octuple holder with a drive motor arranged outside the axis of rotation.

FIG. 4*a* shows a side view of a cylindrical octuple holder with an electric drive motor 23 arranged outside a cylinder 14. Eight flattened sections, which serve as bearing surfaces 3 for a plurality of holders 12 according to the invention, are provided on the outer circumference of the cylinder 14. In the side view selected here, three holders 12 each comprising a combination according to the invention of a compression spring 6 and a bolt 4 are visible. In this illustration, only a compression spring 6 can be seen of a fourth holder 12 on the right-hand side. The compression springs 6 are each screwed to the cylinder 14 by means of two screws 8, in such a way that they are bent away from the associated bolt 4 under preloading and, at the same time, are preloaded toward the bearing surface 3.

The cylinder 14 has an axis of rotation 13 on which a turntable 20 is arranged coaxially. In this illustration, the space which is provided for the components 1 which are to be attached is marked by dashed lines. The diameter of the turntable 20 is selected to be sufficiently large for it to project beyond this space. Above and below the holders 12, the cylinder 14 has two raised strips 9 which serve as a securing stop for the components 1 to be attached and prevent the components 1 attached to the holders 12 from slipping off the bolts 4.

At its outer edge, the turntable 20 has toothing 26 in which a pinion 21, which is arranged on a motor spindle 22 of the electric drive motor 23, engages. By means of the drive motor 23, the cylinder 14 can be rotated into any desired position and therefore each of the holders 12 can be rotated into a specific functional position. In addition, readable codes 27, which are assigned to the holders 12 and one specific functional position, are arranged on the turntable 20. For example, if the left-hand holder 12 is situated in the desired functional position, the code 27 assigned to this holder, which is numbered "1", appears in a predetermined position in order to be read, for example on the left-hand side of the figure.

Figure 4B:
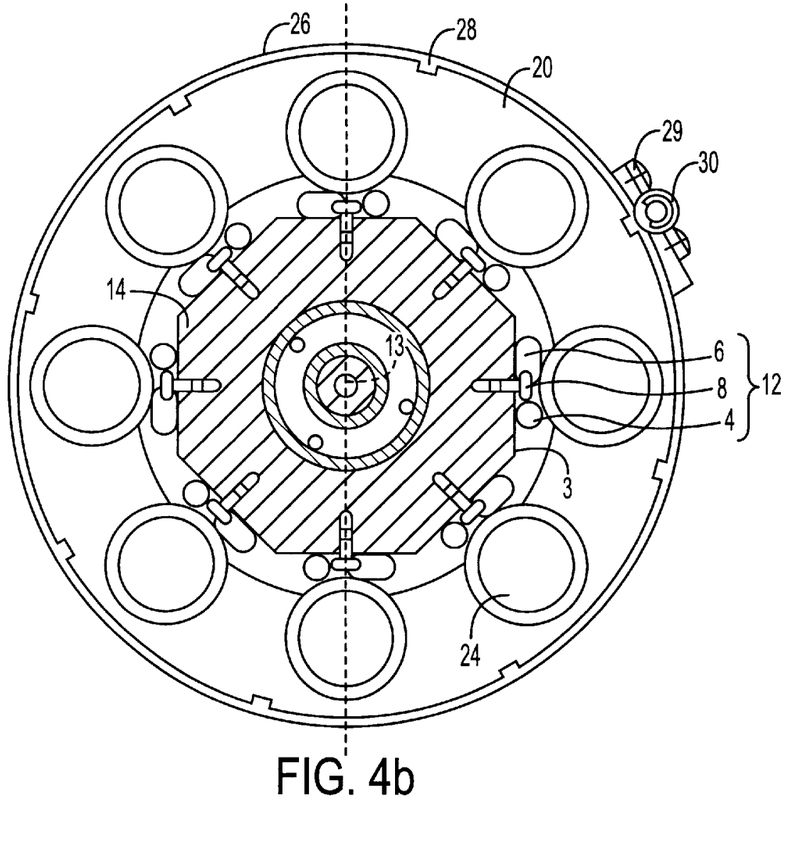

FIG. 4*b* shows a plan view of the cylindrical octuple holder from FIG. 4*a*, viewed from below. A cylinder 14 is mounted rotatably on a fixed axis of rotation 13 and, on its outer circumference, has eight flattened sections. Each flattened section serves as a bearing surface 3 for a holder 12 according to the invention, in each case comprising a bolt 4 and a compression spring 6. Each compression spring 6 is pressed against the associated bearing surface 3 by means of two screws 8 and, at the same time, is bent away from the bolt 4.

A turntable 20 which is arranged coaxially below the cylinder 14 has a clear opening 24 next to each holder 12. As a result, the holders 12 are suitable for the attachment of fluorescence filter blocks, as has already been described with reference to FIG. 3*c* and FIG. 3*d*. Toothing 26, which in this illustration is illustrated in simplified form as a thick, continuous line, is arranged on the outer edge of the turntable 20. A pinion 21 (not shown) on a motor spindle 22 (not shown) of an electric drive motor 23 (not shown) engages in this toothing 26 in order to rotate the cylinder 14 about its axis of rotation 13.

Latching grooves 28, into each of which a latching device 29 can engage, are provided on the outer edge of the turntable 20. After the cylinder 14 has been rotated into a desired functional position by the drive motor 23, the latching device 29 engages in the latching groove 28 associated with this functional position. For this purpose, the latching device 29 has a spring-mounted ball bearing 30 which is preloaded toward the turntable 20 and is pressed into the appropriate latching groove 28. Therefore, the latching device 29 can be used to hold the holders 12 arranged on the cylinder 14 in their predefined functional positions.

Figure 5A:
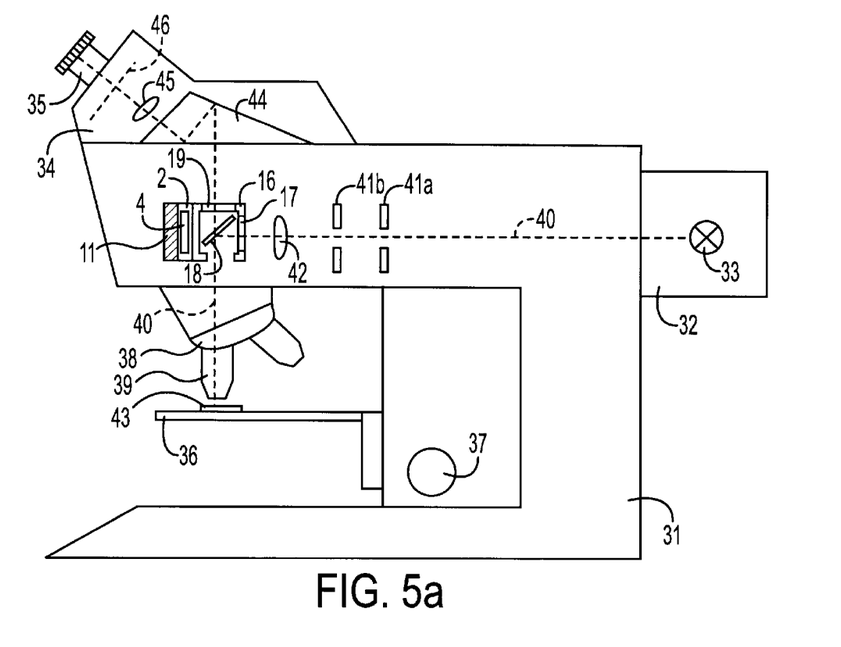
FIG. 5a shows a section through a fluorescence microscope with a fitted longitudinal slide as shown in FIG. 3a, to which fluorescence filter blocks are attached.

FIG. 5*a* shows a section through a fluorescence microscope 31 with a fitted longitudinal slide 11 as shown in FIG. 3*a*, to which a plurality of fluorescence filter blocks 16 are attached next to one another. One fluorescence filter block 16 of these lies in the plane of the drawing.

The fluorescence microscope 31 has a lamp housing 32 with a fitted light source 33, a tube 34 holding eyepieces 35, and a specimen stage 36 and a Z-control knob 37 for adjusting the height of the specimen stage 36. A plurality of objectives 39, one of which has been pivoted into the optical axis 40 as a working objective, are fitted on an objective revolver 38. An illuminating beam path starts from the light source 33, is passed through apertures 41a, b and illuminating optics 42, is deflected at a beam splitter 18 of the cube-shaped fluorescence filter block 16 and is focused through the objective 39 onto a specimen 43 lying on the specimen stage 36. The imaging beam path which starts from this specimen 43 passes through the beam splitter 18 and a blocking filter 19, is deflected at a prism 44 and is then imaged through tube optics 45 into an eyepiece focal plane 46. This is viewed using the eyepieces 35.

The fluorescence filter block 16, in a known way, bears the beam splitter 18, an excitation filter 17 in the illuminating beam path and the blocking filter 19 in the imaging beam path. A holder 12 according to the present invention, which is fitted to the longitudinal slide 11, engages in a dovetail carriage 2 that is arranged on the outside of the fluorescence filter block 16. The longitudinal slide 11 has a plurality of holders 12 according to the invention arranged next to one another with fluorescence filter blocks 16 attached to them. Only a bolt 4 of the holder 12 can be seen in the plane of the drawing. In each case, one of the fluorescence filter blocks 16 can be introduced into the illuminating or imaging beam path by suitable displacement of the longitudinal slide 11 in such a way that its excitation filter 17 is arranged in the illuminating beam path and its blocking filter 19 is arranged in the imaging beam path.

Figure 5B:
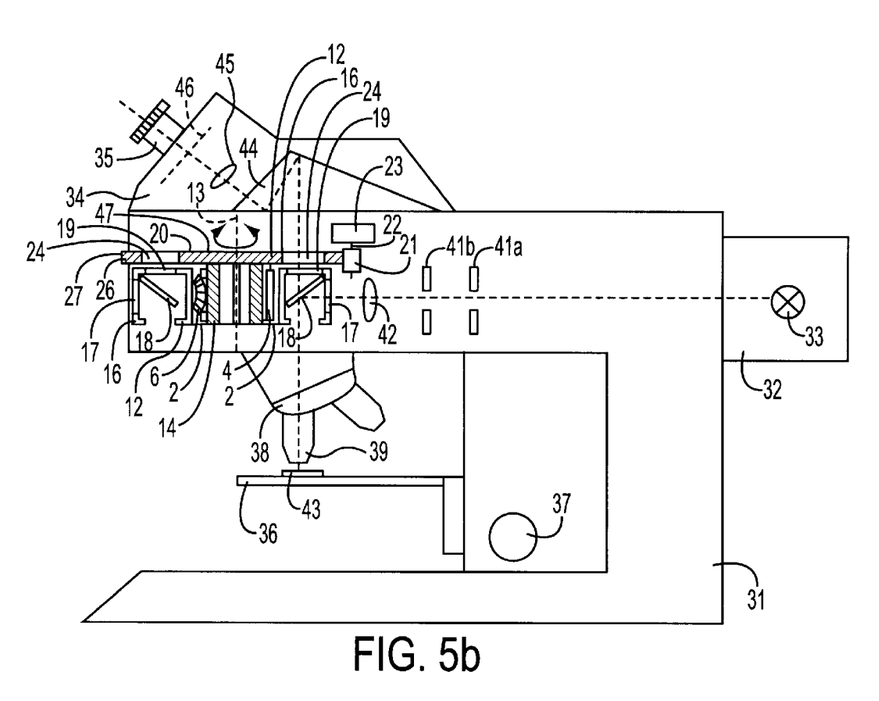
FIG. 5b shows a section through a fluorescence microscope with a fitted cylindrical multiple holder as shown in FIG. 3b, to which fluorescence filter blocks are attached.

FIG. 5b shows a section through a fluorescence microscope 31 with a fitted cylindrical multiple holder 47 to which a plurality of fluorescence filter blocks 16 are attached. The fluorescence microscope 31 has a lamp housing 32 with an integrated light source 33, a tube 34 with eyepieces 35, and an objective revolver 38 with an objective 39 that has been pivoted into the optical axis. A specimen 43 lies beneath the objective 39, on a specimen stage 36, the height of which can be adjusted using a Z-control knob 37.

An illuminating beam path starts from the light source 33, is passed through apertures 41a, b, illuminating optics 42 and an excitation filter 17, is deflected at a beam splitter 18 and is focused through the objective 39 onto the specimen 43. The imaging beam path, which starts from the specimen 43, passes through the objective 39, the beam splitter 18, the blocking filter 19, is deflected at a prism 44 and is imaged through tube optics 45 into an eyepiece focal plane 46. This image can be viewed using the eyepieces 35.

The cube-shaped fluorescence filter block 16, which is arranged on the right and bears the beam splitter 18, the excitation filter 17 in the illuminating beam path and the blocking filter 19 in the imaging beam path, has a dovetail carriage 2 on the outside. It is attached to a holder 12 according to the invention, which is part of the cylindrical multiple holder 47. Only a bolt 4 of the holder, which engages in the dovetail carriage 2, can be seen.

The multiple holder 47 comprises a cylinder 14 which is mounted so that it can rotate about an axis of rotation 13. On its outer circumference, the cylinder 14 has a plurality of flattened sections which serve as bearing surfaces 3 on which a plurality of holders according to the invention are arranged, with fluorescence filter blocks 16 attached to them. In the sectional illustration shown here, one holder 12 according to the invention is shown on both the left and right, said holders 12 in each case engaging in the dovetail carriage 2 of the fluorescence filter block 16 that is attached to the holder 12. Only a compression spring 6 of the left-hand holder can be seen, and only the bolt 4 of the right-hand holder can be seen. In a known way, each fluorescence filter block 16 has an excitation filter 17, a beam splitter 18 and a blocking filter 19. A turntable 20, which has a clear opening 24 next to each blocking filter 19 allowing the imaging beam path to pass through without being impeded, is attached coaxially on the axis of rotation 13 of the cylinder 14.

On its outer edge, the turntable 20 has toothing 26 in which a pinion 21, which is fitted on a motor spindle 22 of an electric drive motor 23, engages. On the front side of the stand, facing toward a microscope user, i.e. to the left in this figure, the turntable 20 projects a short distance out of this stand housing surface facing the microscope user. For this specific purpose, an opening is provided in the stand housing. That part of the turntable 20 which is visible to the microscope user through said opening bears a readable code 27 that provides information about the fluorescence filter block 16 that has currently been pivoted into the illuminating and imaging beam path. If the cylinder 14 is rotated by means of the drive motor 23 and, as a result, a different fluorescence filter block 16 is pivoted into the illuminating and imaging beam path, the respectively associated code 27 of the fluorescence filter block 16 that is now positioned in the beam path appears in the opening in the stand housing.

The association between the code 27, for example a number code, and the fluorescence filter blocks 16 that are attached to the individual holders of the multiple holder is either carried out by the manufacturer of the fluorescence microscope 31 or may be fixed at the start of work by the microscope user himself.

It will be appreciated by those skilled in the art that the present invention can take the form of other embodiments that embody the basic principles of the invention, as illustrated by example above. It is intended that the accompanying claims will cover all such obvious modifications and equivalents of the disclosed subject matter.

The entire disclosure of German Patent Application No. 199 36 497.4 is hereby incorporated by reference into the present application.

What is claimed is:

1. A holder for attaching at least one component having a dovetail slot to at least one bearing surface comprising:
   a. at least one elongated member fixed with respect to the at least one bearing surface; and
   b. a preloaded compressible resilient member fixed with respect to the at least one bearing surface adjacent to each elongated member, wherein the elongated member and the preloaded compressible resilient member cooperate with the dovetail slot to secure the component against the bearing surface.

2. The holder of claim 1 wherein the elongated member is a pin-like bolt attached just in front of and parallel to the bearing surface, and wherein the compressible resilient member is a compression spring attached just in front of and parallel to the bearing surface adjacent to the bolt, the compression spring bent away from the bolt under preloading such that the preloading of the bent compression spring presses the bolt and the compression spring into the two inner sides of the dovetail slot.

3. The holder of claim 2 wherein the bolt is cylindrical.

4. The holder of claim 2 wherein the cross-section of the bolt is defined by at least three sides.

5. The holder of claim 2 wherein the compression spring has two ring eyelets that are formed integrally on an outer edge of both ends of the compression spring.

6. The holder of claim 5 wherein the two ring eyelets of the compression spring lie in one plane.

7. The holder of claim 5 wherein the two ring eyelets of the compression spring are angled off toward the bearing surface.

8. The holder of claim 5 further comprising a clamping means for clamping the two ring eyelets of the compression spring against the bearing surface.

9. The holder of claim 8 wherein the clamping means comprises two screws that are screwed into the bearing surface and that are aligned on a line parallel to the bolt.

10. The holder of claim 2 wherein the middle region of the compression spring is pressed against the bearing surface.

11. The holder of claim 2 further comprising at least one raised strip positioned on the bearing surface next to at least one end of the bolt, wherein the raised strip prevents displacement of the dovetail slot in the longitudinal direction of the bolt.

12. The holder of claim 2 further comprising two holding pins that attach the bolt to the bearing surface.

13. The holder of claim 2 further comprising multiple sets of bolt and corresponding compression spring pairs attached in front of and parallel to at least one bearing surface.

14. A multiple holder for attaching multiple components that each have a dovetail slot to at least one bearing surface comprising:
   a. a mounting member having a plurality of holders mounted thereon, wherein each holder comprises:
      i. a pin-like bolt attached just in front of and parallel to the bearing surface; and
      ii. a compression spring attached just in front of and parallel to the bearing surface next to the bolt and bent away from the bolt under preloading, wherein the preloading of the bent compression spring presses the bolt and the corresponding compression spring into the two inner sides of the dovetail slot of a component.

15. The multiple holder of claim 14 further comprising a component attached to the multiple holder, the component comprising a fluorescence filter block.

16. The multiple holder of claim 14 wherein the mounting member is an elongated bar having a single bearing surface.

17. The multiple holder of claim 14 wherein the mounting member is a cylinder having multiple bearing surfaces.

18. The multiple holder of claim 17 wherein the cylinder is arranged rotatably on a fixed axis of rotation.

19. The multiple holder of claim 18 further comprising a turntable attached coaxially to the cylinder whereby rotation of the turntable causes rotation of the cylinder.

20. The multiple holder of claim 19 wherein the turntable has a diameter greater than the diameter of the cylinder together with the components that are held thereon, and wherein the turntable has at least one opening that allows a light beam to pass through the turntable unimpeded.

21. The multiple holder of claim 20 further comprising at least one of a manual and motor action means, wherein the turntable is rotatable by at least one of the manual and motor action means, and wherein the manual or motor action means is located in the peripheral region of the turntable.

22. The multiple holder of claim 21 further comprising toothing around an outer edge of the turntable in which a pinion engages.

23. The multiple holder of claim 19 further comprising a motor arranged inside the cylinder, the motor comprising a motor spindle coaxially connected to the turntable.

24. A fluorescence microscope having an illuminating beam path that is directed onto a specimen and an imaging beam path that starts from the specimen comprising:
   a. a lens positioned in the imaging beam path;
   b. an eyepiece for viewing the imaging beam; and
   c. at least one holder for attaching in at least one of said beam paths at least one component having a dovetail slot to at least one bearing surface comprising:
      i. at least one elongated member fixed with respect to the at least one bearing surface; and
      ii. a preloaded compressible resilient member fixed with respect to the at least one bearing surface adjacent to each elongated member, wherein the elongated member and the preloaded compressible resilient member cooperate with the dovetail slot to secure the component against the bearing surface.

25. The fluorescence microscope of claim 24 further comprising at least one component attached to the at least one holder.

26. The fluorescence microscope of claim 25 wherein the component comprises a fluorescence filter block.

27. The fluorescence microscope of claim 26 wherein the fluorescence filter block comprises:
   a. an excitation filter;
   b. a blocking filter perpendicular to the excitation filter; and
   c. a beam splitter arranged at 45 degrees between the excitation filter and the blocking filter;
   d. wherein the holder can be arranged to position the excitation filter in the illuminating beam path and the blocking filter in the imaging beam path.

28. The fluorescence microscope of claim 24 wherein the elongated member is a pin-like bolt attached just in front of and parallel to the bearing surface, and wherein the compressible resilient member is a compression spring attached just in front of and parallel to the bearing surface adjacent to the bolt, the compression spring bent away from the bolt under preloading such that the preloading of the bent compression spring presses the bolt and the compression spring into the two inner sides of the dovetail slot.

29. The fluorescence microscope of claim 28 further comprising a mounting member having a plurality of holders mounted thereon.

30. The fluorescence microscope of claim 29 wherein the mounting member is an elongated bar having a single bearing surface.

31. The fluorescence microscope of claim 29 wherein the mounting member is a cylinder having multiple bearing surfaces.

32. The fluorescence microscope of claim 29 wherein each holder can be moved into a functional position.

* * * * *